United States Patent

[11] 3,599,107

[72] Inventors Karl J. Knudsen
East Rockaway;
Robert J. Gartner, Carle Place, both of, N.Y.
[21] Appl. No. 778,529
[22] Filed Nov. 25, 1968
[45] Patented Aug. 10, 1971
[73] Assignee Sperry Rand Corporation

[54] THERMALLY COMPENSATED LASER DISCHARGE STRUCTURE
6 Claims, 4 Drawing Figs.

[52] U.S. Cl. .................................................. 330/4.3,
313/204, 331/94.5
[51] Int. Cl. .................................................. H01s 3/05
[50] Field of Search .......................................... 330/4.3;
331/94.5; 313/204

[56] References Cited
UNITED STATES PATENTS
3,501,714 3/1970 Myers et al. .................. 331/94.5

OTHER REFERENCES

Knudsen et al., Argon Ion Lasers, " Sperry Engr. Rev.," Vol. 19, No. 1, 1966, pp. 27— 31

Hernquist et al., Construction of Long Life Argon Lasers, " IEEE J. Quantum Electronics," Vol. QE-3, No. 2, Feb. 1967, pp. 66— 72

*Primary Examiner*—Rodney D. Bennett, Jr.
*Assistant Examiner*—Daniel C. Kaufman
*Attorney*—S. C. Yeaton ABSTRACT: A gas laser including a quartz insulator tube enclosing a stack of graphite discs having a central aperture forming a laser discharge path wherein the individual discs are spatially separated and electrically insulated from one another by quartz rods inserted into spacer holes disposed about the central aperture, the depth of the spacer holes in the discs intermediate the end discs being constructed and arranged in a manner to compensate for thermally induced variations in the length of the stack.

INVENTORS
KARL J. KNUDSEN
ROBERT J. GARTNER
BY
*S. C. Geaton*
ATTORNEY

THERMALLY COMPENSATED LASER DISCHARGE STRUCTURE

BACKGROUND OF THE INVENTION

The present invention relates to lasers and more particularly to means for providing thermal compensation in high-power gas laser devices of the type in which the discharge bore is formed by a central aperture in a stack of refractory members.

Early state of the art gas lasers, as exemplified by the helium-neon system, generally operated in the infrared or long wavelength end of the visible spectrum and were inherently low-power devices capable of providing only milliwatts of power output in sustained continuous wave operation. These devices produced lasing action by means of energy transitions existing between excited atoms in the gas. In the interest of achieving higher power output and extending the operative frequency range, the lasing properties of various other gases were investigated. This research led to the development of the ion laser in which lasing action is produced from the transitions between excited states of the ions in a gaseous discharge. To date, these devices have operated successfully with the noble gases, particularly argon, and have produced light beams extending through the short-wavelength end of the visible spectrum into the ultraviolet region at power levels on the order of 1 watt or more in sustained continuous wave operation. To obtain the high power output available with ion lasers, however, a high current must be established in the discharge path and therefore intense heat develops within the tube. The extent of the heating problem can be readily appreciated when it is realized that the temperature in the discharge tube rises at least 1,000° C. and perhaps as much as a few thousand degrees when lasing operation commences under high discharge current conditions. Since the interior diameter of the discharge tube is typically a few millimeters, the amount of tube wall surface area through which the heat can be dissipated is very small. Hence, ordinary glass, quartz and similar ceramic materials are not suitable for high-power devices. These materials have not only comparatively low safe operating temperatures but also low thermal conductivity which inhibits heat radiation into the ambient environment. Consequently, cooling by means of a water jacket surrounding the exterior wall of the tube does not alleviate the problem, since the water merely cools the exterior surface of the tube causing a large temperature difference to exist across the tube wall.

In addition to the heat problem, the high current is accompanied by intense ion bombardment of the tube wall. In the case of quartz, for example, the ion bombardment releases cathode poisoning gases in the tube and causes erosion of the tube wall leaving residues thereon which are subsequently heated by the hot gas resulting in localized arcing and catastrophic puncturing. Ion bombardment also causes gas cleanup, that is, loss of gas through the tube wall, at a rate of 1 to 2 percent per hour which is intolerable in view of the low operating pressure and narrow range of pressures required for optimum lasing action.

As a result of the difficulties experienced with tubes constructed of the aforementioned materials, a fairly recent innovation in the ion laser art disclosed a quartz insulator tube enclosing a stack of refractory, high thermal conductivity discs having a central bore forming the laser discharge path, the individual refractory members being spatially separated from one another by intervening insulating washers constructed of a material such as fused quartz. In this instance, the intense heat produced by the high current discharge is confined to the small central bore in the discs from which it is quickly radiated through the substantially larger surface area of the quartz vacuum envelope enclosing the discs. Quartz is a suitable insulator tube material for devices of this type because the insulator tube diameter is typically 1 inch or larger and thus provides a substantially increased tube wall area through which the heat is radiated. Other materials such as molybdenum and tantalum have been investigated for constructing the refractory discs but graphite is preferred because of its low cost, easy machinability, high operating temperature, relatively high thermal conductivity and resistance to corrosion by ion bombardment. Graphite has the disadvantage, however, of having a comparatively large thermal coefficient of expansion in a direction parallel to the central bore. In fact, the high temperature produced in the central bore of the discs during lasing operation is sufficient to cause approximately 1 centimeter of expansion in ½-meter-long stack. Consequently, in a case where the stack is held rigidly in place within the quartz envelope under nonoperating conditions, the expansion occurring during operation places extreme tension on the quartz tube causing it to crack or shatter. Heretofore, this problem has been solved by threading the graphite discs onto sapphire rods which are slightly longer than the stack under nonoperating conditions and fixedly secured to the insulator tube. The rods prevent the discs from canting to assure that alignment of the discharge bore is maintained and also enable the graphite stack to expand longitudinally by a precise amount so that the stack forms a rigid structure under operating conditions without applying tension to the insulator tube. This design is highly susceptible to shock and vibration when the laser is not in use inasmuch as the stack is able to move to and fro along the sapphire rods thereby severely impairing tube life and reliability.

SUMMARY OF THE INVENTION

The present invention overcomes the aforementioned disadvantages caused by longitudinal expansion of the discharge tube forming stack by the provision of unique means for electrically insulating and spatially separating the individual refractory members of the stack. In place of the quartz washers used as insulating spacers in the prior art, in the present invention a plurality of fused quartz insulating rods are inserted in spacer holes disposed about the central bore of the refractory members and extending only partially therethrough to provide spatial separation and electrical insulation therebetween. More specifically, the spacer holes in the refractory members intermediate the end members of the stack are arranged and constructed such that the insulating rods inserted into holes on opposite sides thereof have sufficient depth to overlap by a prescribed amount so as to compensate for thermally induced expansion of the stack.

DESCRIPTION OF THE PREFERRED EMBODIMENT

Figure 1:
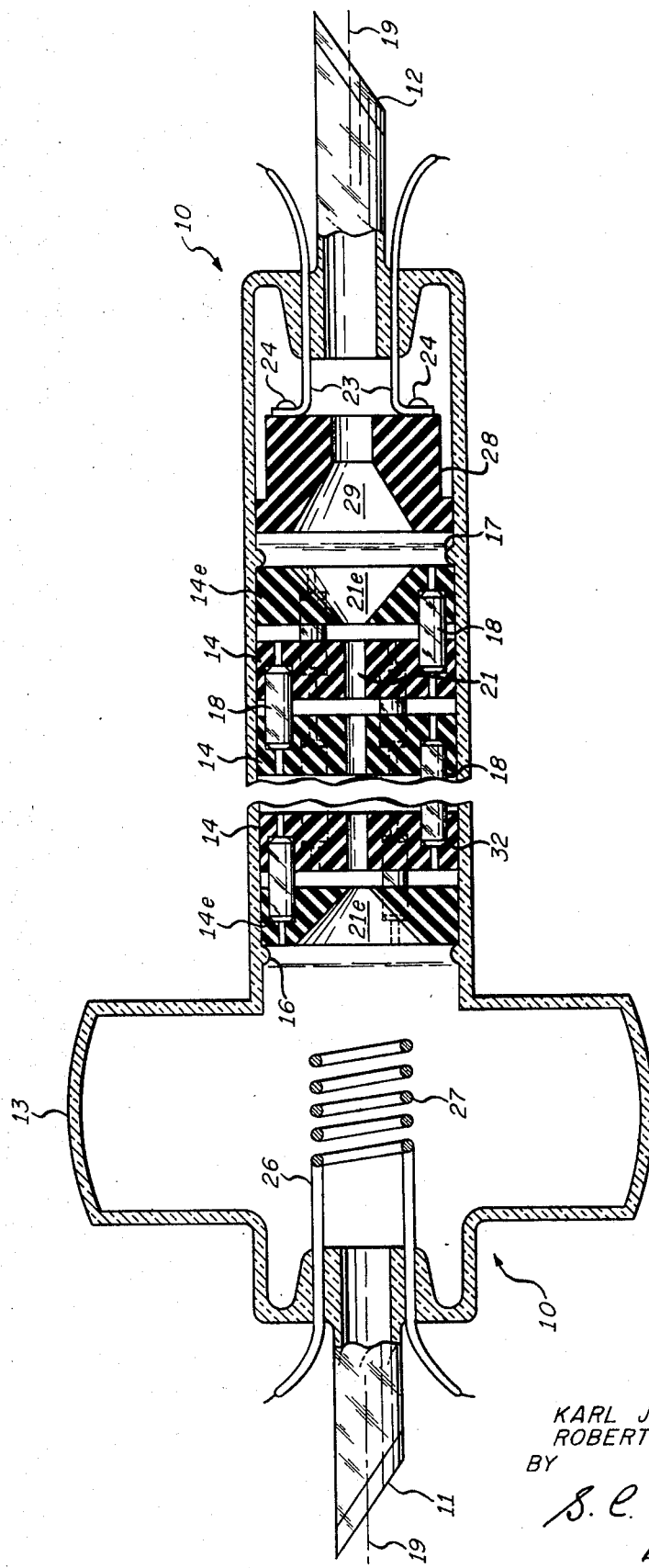
FIG. 1 is a longitudinal sectional view taken across the diameter of a laser tube structure constructed in accordance with the present invention.

Referring to FIG. 1, precision bore quartz insulator tube 10 is sealed at each end by quartz Brewster windows 11 and 12 and interconnected with quartz ballast tank 13 to form an enclosed container, commonly referred to as a vacuum envelope, in which argon is confined at a pressure of about one-half Torr. Neon, krypton and xenon may also be used to function as the ionized gaseous lasing medium but argon is preferred because of its greater efficiency and higher power output capability. Both the insulator tube and the ballast tank are cylindrically shaped and have a wall thickness of about 1 millimeter with interior diameters of approximately 1½ inches and 3 inches, respectively. The ballast tank is generally constructed with a volume equal to or greater than that of the insulator tube since it is used for minimizing pressure variations that are likely to occur during the warmup period following the application of electrical power to the lasing medium. Electrically conductive graphite discs 14 are arranged in a stack between notches 16 and 17 in the insulator tube and separated from one another by quartz spacer rods 18. The maximum diameter of the graphite discs as observed along axis 19 of the tube is slightly less than the interior diameter of the tube for easy insertion therein. Axially oriented apertures 21 passing through the center of the respective discs in collinear alignment with one another form a segmented laser discharge bore. The central apertures $21_e$ in graphite discs $14_e$ at each end of the stack expand conically from a diameter substantially equal to that of the discharge bore at the ends remote from the adjacent Brewster windows to a considerably larger diameter at the opposite end to provide a smooth transition for the laser beam between the small area of the segmented discharge bore and the larger area of the insulator tube. This construction minimizes ion sputtering damage to the ends of the discharge bore.

To achieve lasing action in a discharge bore made of a conductive material such as graphite, the length to diameter ratio of the central aperture must be within prescribed limits. In general, the ratio should be less than 10 to 1 and preferably about 5 to 1. Thus, for a discharge bore diameter of 2 millimeters, graphite discs 1 centimeter in length forming a stack about one-half meter long have operated satisfactorily in a tube measuring 1 meter between the Brewster windows.

Figure 2:
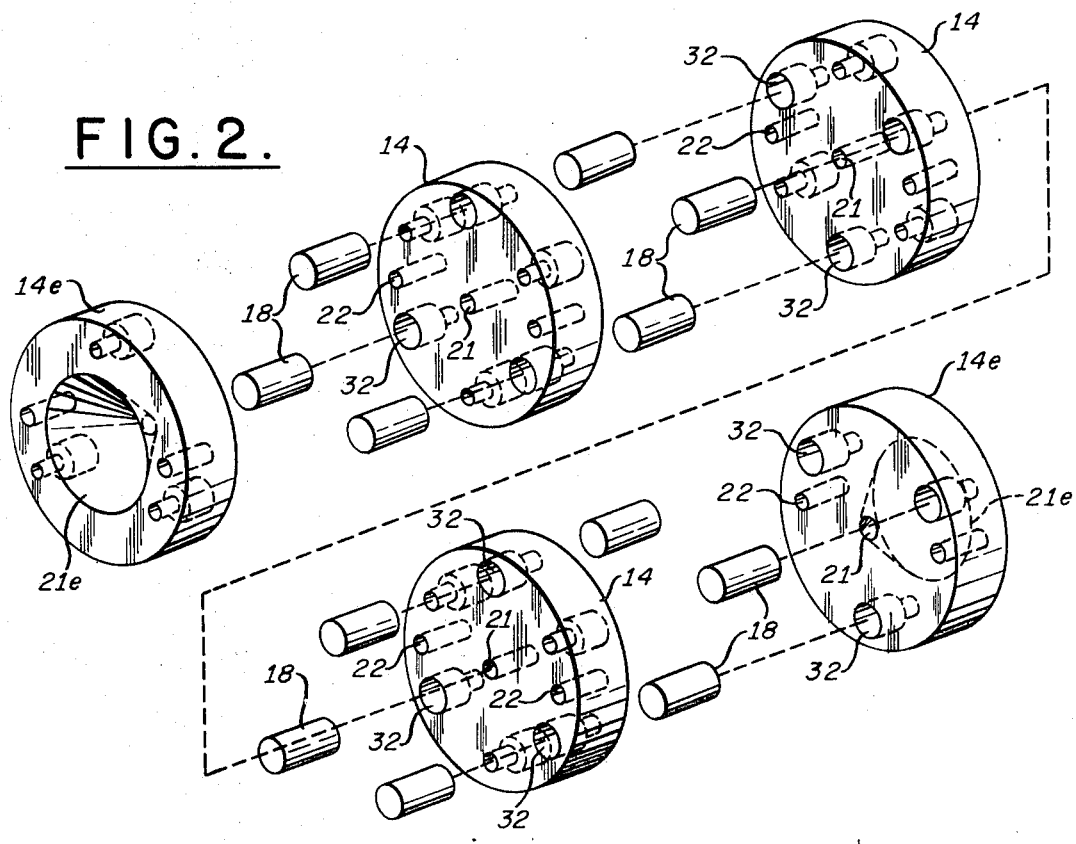
FIG. 2 is a partial perspective view of the structure shown in FIG. 1.

Passages 22 displaced from the center of the graphite discs function as gas return lines to maintain equalized pressure throughout the length of the segmented discharge bore. In the absence of these gas return lines, ions flowing towards one of the electrodes in a DC excited laser would tend to increase the pressure at one end of the tube and decrease it at the other end resulting in diminution or perhaps even cessation of lasing action. To assure that lasing action cannot be established in these passages, their length to diameter ratio must be greater than the corresponding ratio for the discharge bore. Thus, since the length of the gas return lines is equal to that of the discharge bore, their diameter must be smaller. To assure that the gas pressure is equalized through the length of the segmented discharge tube, several gas return lines are generally used as indicated in FIG. 2.

The excitation for stimulating the laser discharge is applied to the gas by coupling the positive and negative terminals respectively of a DC source (not shown) to leads 23 connected to anode terminals 24 and to leads 26 connected to cathode 27. To minimize noise, the cathode is positioned symmetrically and in close proximity to the discharge bore in the graphite discs. A barium impregnated thyratron type cathode is used to provide the required high emission current densities for the life of the laser. Anode 28 is formed by a graphite disc having a central aperture 29 which tapers from a large diameter at the end proximate the graphite stack to a diameter which is substantially smaller but still larger than the discharge bore diameter. This construction limits the diameter of the discharge beam and precludes the possibility of the anode leads being seared by the laser beam.

As previously mentioned, since graphite is a refractory material having relatively high thermal conductivity compared to quartz, it is able to withstand the high operating temperature of the laser discharge and to quickly radiate the heat therefrom. Moreover, the vacuum envelope is suitably formed of quartz in this instance, since the gas discharge is not directly in contact with it and its interior wall area is considerably larger than in the case where it is used to form the discharge bore thereby reducing the heat applied to it. In addition, ion sputtering of the envelope is substantially reduced thereby decreasing the likelihood of catastrophic puncturing. Graphite, however, is characterized by a comparatively high thermal coefficient of expansion in the direction parallel to the axis of the discharge bore. Consequently, when the laser is in operation, the extreme heat in the discharge bore causes the stack to expand longitudinally and force again notches 16 and 17 thereby placing the quartz tube under considerable tension and increasing the likelihood of cracking or shattering of the tube. Radial expansion of the graphite is rather small so there is no concern about the discs forcing against the sidewall of the insulator tube.

In the present invention, the longitudinal expansion of the graphite stack is compensated by quartz spacers 31 inserted in spacer holes 32 in the discs. Referring to FIG. 2, it is seen that the spacer holes extending into each disc from opposite sides thereof are not collinearly aligned. This construction enables the spacer holes to extend more than halfway through the discs. The depth of the holes in the end discs is not critical. In the discs intermediate the end discs, though, the depth of the holes extending into each disc from opposite sides thereof is closely controlled to provide a predetermined amount of overlap $d$. More specifically, to achieve precise temperature compensation, the total overlap obtained by adding the overlap in all of the intermediate discs is made equal to the sum of the distances $D$ between the bottom of the spacer holes and the opposite surface of each of the end discs. Thus, for a stack comprising a total of 12 discs, two end discs plus 10 intermediate discs, $2D=10d$.

Figure 3A:
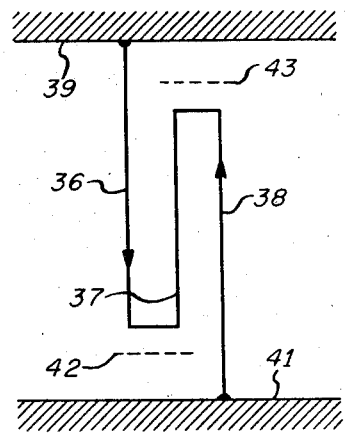
FIGS. 3a and 3b are drawings of a simplified rigid body structure which are useful for explaining the operation of the invention.
Figure 3B:
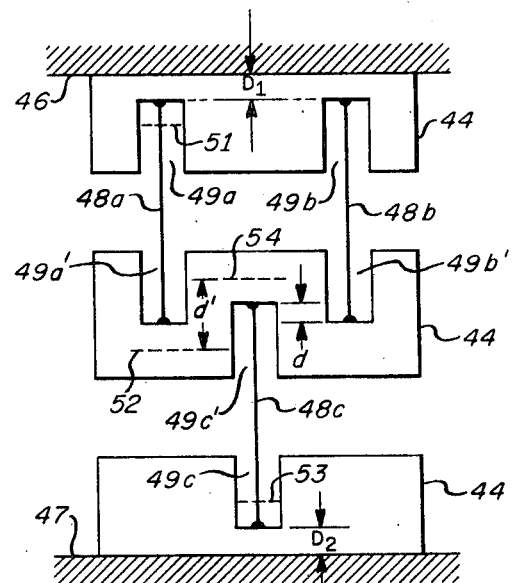

The manner in which this construction provides thermal expansion compensation will be more clearly understood by referring to FIGS. 3a and 3b. In FIG. 3a, assume that rods 36, 37 and 38 are rigidly coupled together and connected between fixed surfaces 39 and 41. As rods 36 and 38 expand in the directions indicated by the arrows to move to the positions shown by dashed lines 42 and 43, rod 37 will be placed under tension unless it also expands to a length equal to the distance between dashed lines 42 and 43. The same conditions prevail in FIG. 3b where the graphite discs 44 are positioned between fixed surfaces 46 and 47 and rigidly coupled by rods $48_a$, $48_b$ and $48_c$ extending to the bottom of spacer holes $49_a$, $49_a'$, $49_b$, $49_b'$, $49_c$ and $49_c'$. The quartz spacers 31 used in FIG. 1 are rigid members having a longitudinal thermal coefficient of expansion an order of magnitude less than that of the graphite discs and therefore may be regarded as providing a rigid, temperature insensitive coupling between the discs in the same manner as rods $48_a$, $48_b$ and $48_c$. When the bottom of the spacer hole $49_a$ moves to the position indicated by dashed line 51 as the temperature rises, the bottom of spacer hole $49_a'$ will be constrained to move to the position indicated by dashed line 52. Likewise, the bottom of spacer holes $49_c$ and $49_c'$ will move to the positions indicated by dashed lines 53 and 54 when the temperature rises. If the length of the overlap region $d$ extends to a length equal to the distance $d'$ between dashed lines 52 and 54, the center disc will not be placed under tension. The same situation applies to spacer holes $49_b$ and $49_b'$ relative to holes $49_c$ and $49_c'$. Thus, by providing an overlap region having a length equal to the sum of the distances $D_1$ and $D_2$, the stack is compensated for thermally induced longitudinal expansion.

In the absence of temperature compensation provided in accordance with the foregoing description, it should now be apparent that each of the intermediate discs would be exerted on by compressive forces as the temperature rose. The inability of the discs to compress, however, would cause the entire stack to expand longitudinally against the end notches in the insulator tube and thereby place the tube under tension as stated previously.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. In a laser apparatus comprising an insulator tube enclosing a longitudinally disposed array of refractory members held spatially separated from one another by insulating members and each having an aperture extending parallel to the longitudinal axis of the insulator tube such that the respective apertures align to form a discharge path, the improvement wherein
the refractory members have spacer holes extending partially therethrough in a direction parallel to but displaced from the discharge path forming aperture, the spacer holes on one side of the refractory members intermediate the end refractory members being misaligned from the spacer holes on the opposite side of each of said intermediate refractory members thereby enabling said spacer holes to have sufficient depth to overlap by a prescribed amount in proportion to the distance between the bottom of the spacer holes in the end members and the side of the end members remote from the intermediate members, and the insulating members are rods positioned in the respective spacer holes such that each rod extends from the bottom of a spacer hole in one refractory member to the bottom of a collinearly aligned spacer hole in an adjacent refractory member and thereby operates to maintain alignment of the discharge beam forming aperture.

2. The apparatus of claim 1 wherein the individual spacer holes in a given side of each refractory member have substantially the same depth and the aggregate overlap of a pair of spacer holes in each of the intermediate refractory members is substantially equal to the sum of the distances between the bottom of a spacer hole in each end refractory member and the opposite side thereof.

3. The apparatus of claim 1 wherein the aggregate overlap of the spacer holes in the totality of the intermediate refractory members is substantially equal to the sum of the distances between the bottom of a spacer hole in both end refractory members and the respective opposite sides thereof.

4. The apparatus of claim 3 wherein the active lasing medium contained within the insulator tube is a gas selected from the group consisting of argon, xenon, krypton and neon.

5. The apparatus of claim 3 wherein the refractory members are graphite discs in which the discharge path forming aperture is centrally located and the insulating members are fused quartz rods.

6. The apparatus of claim 5 wherein the central aperture in the end graphite discs is conically flared from a diameter approximately equal to the diameter of the aperture in the intermediate discs at the end adjacent thereto to a substantially larger diameter at the opposite end and the graphite discs further include a bypass channel displaced from and having a smaller diameter than the diameter of the central aperture.